UNITED STATES PATENT OFFICE.

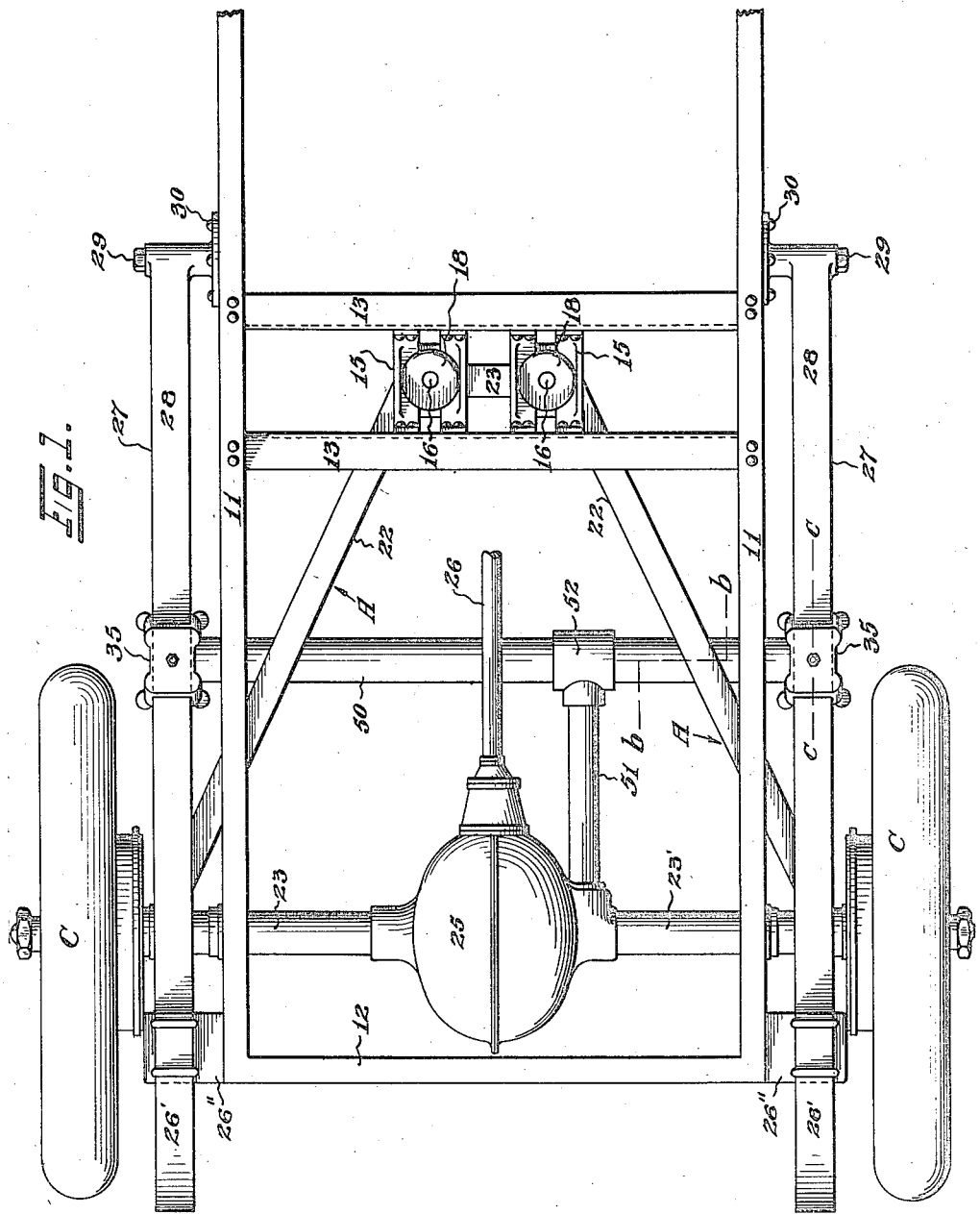

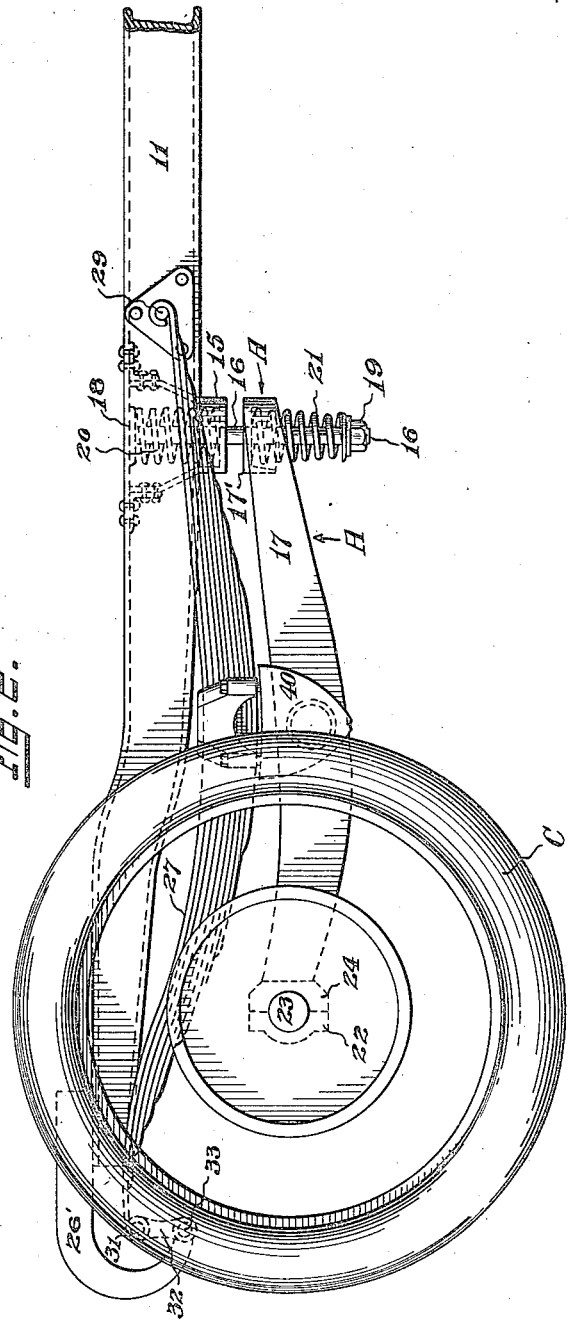

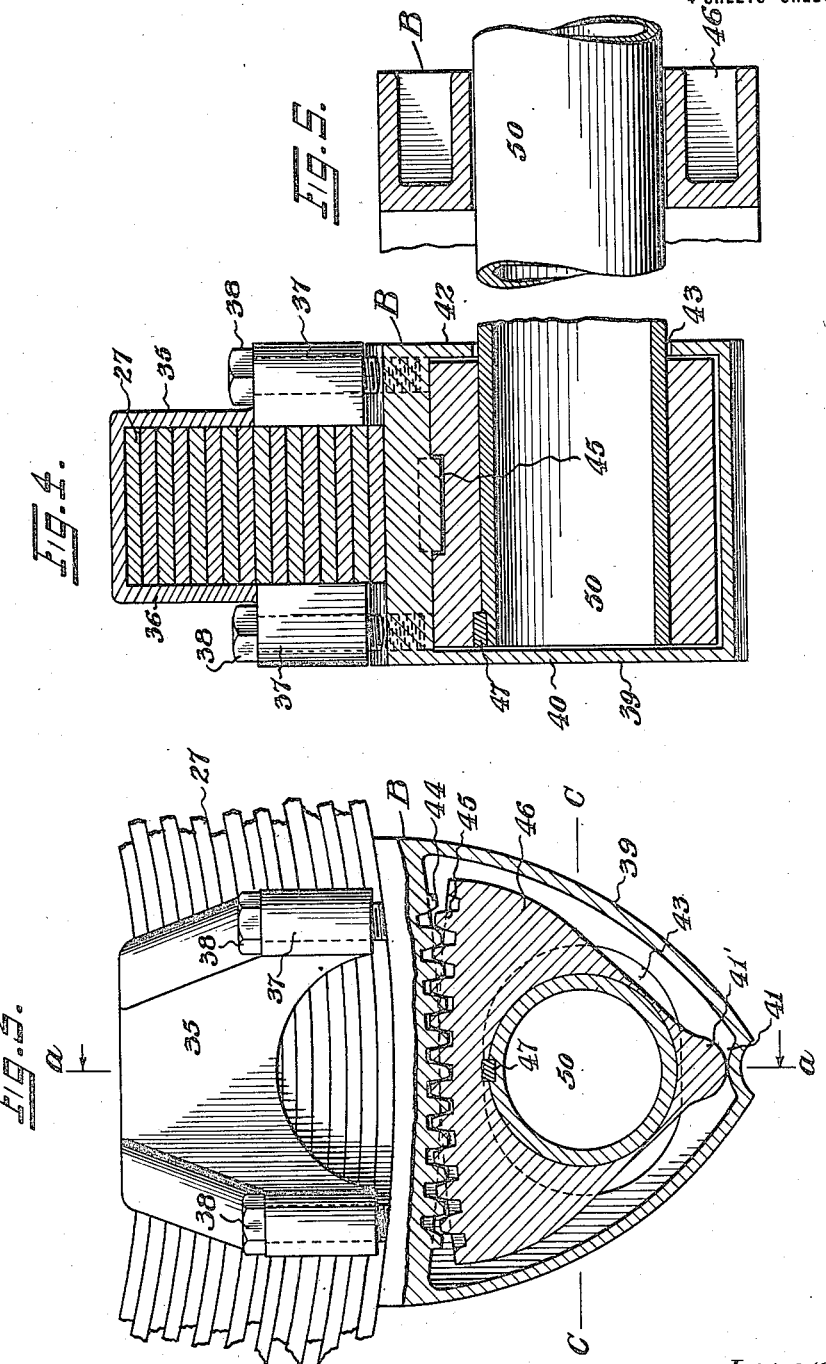

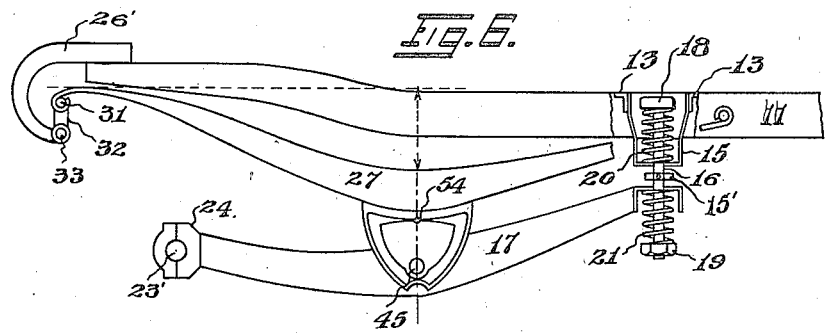
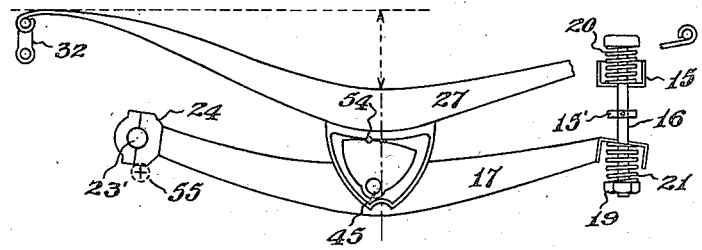
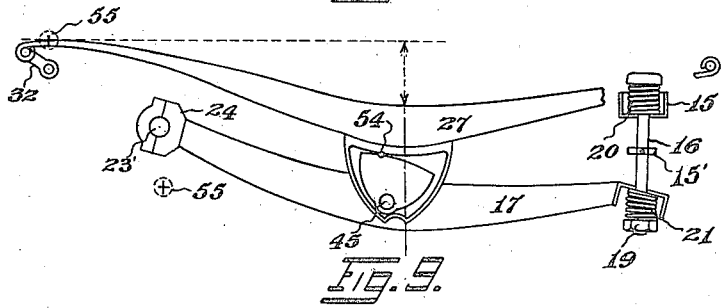
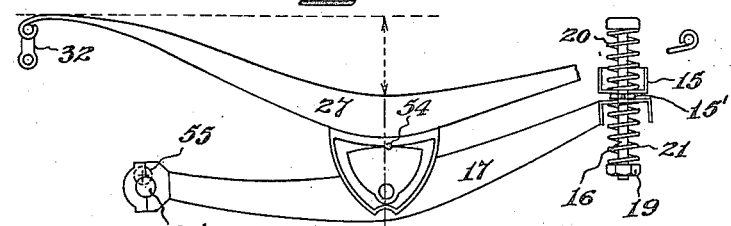

EMIL KOEB, OF NEW YORK, N. Y.

VEHICLE SUSPENSION.

1,220,431.  Specification of Letters Patent.  Patented Mar. 27, 1917.

Application filed July 7, 1916. Serial No. 107,898.

*To all whom it may concern:*

Be it known that I, EMIL KOEB, a citizen of the United States, residing in New York, in the county of New York and State of New York, have invented certain new and useful Improvements in Vehicle Suspension, of which the following is a specification.

This invention relates to vehicle frames and especially to spring suspension means for vehicle frames adapted for automobiles and the like, of substantially the broad type of construction shown in United States Letters Patent 1,156,909, granted October 9, 1915, to myself Emil Koeb and Ralph Thompson, as joint inventors.

The main object of this invention is to solve the problem of shock-prevention in automobiles, etc., by the application of a pair of compensating side levers, combined into a sub-frame, and connected with the rear-axle, at its open ends, and with a light shock-absorbing spring member or members at the forward end; and also connected together adjacent to the center, by a cross-bar extending across from side to side, having its ends mounted in float-journal-boxes; each of which float-journal-boxes is movably, and usually vibratorily mounted in a housing, inclosing the same; each of such housings being secured to and in connection with the central portion of its particular side suspension-leaf-spring of the vehicle, through a suitable securing-clip or yoke, which springs are of the well known form shown.

Another object of this invention is to provide a spring suspension device, in which the smaller shocks will be absorbed by one element of the device, and the greater shocks absorbed by another element of said device.

Another object of the invention is to provide a compound spring and lever arrangement, for resiliently supporting an automobile body or the like, in which one member of such arrangement will independently take up the small shocks, and another member will coöperate with such first mentioned member to take up the greater shocks to which the body may be subjected.

A still further object of the invention is to provide a compound spring suspension arrangement, in which one element is sensitive to small shocks to the exclusion of another element which will absorb the greater shocks; when the activity of the first mentioned element has been exhausted.

Still another object of the invention is to provide a new and improved pivot connection between certain of the moving members, so constructed that the friction is reduced to a minimum, and also to provide means for taking up shocks for different loads, whether upward or downward.

Another object of my invention is the provision upon the pivotal connection of a differential rocker seat whereby the automatic operation of loading or unloading the vehicle causes certain of the levers of the spring suspension to be automatically varied in certain predetermined ratios.

In the drawings, Figure 1 is a top plan view of the rear portion of an automobile chassis supplied with my new and improved spring suspension mechanism or device.

Fig. 2 is a side elevation of my device.

Fig. 3 is a side view partially in section, taken along the plane C—C, Fig. 1, showing my improved rocker seat and connection.

Fig. 4 is a side view of the view shown in Fig. 3, taken in the central vertical section *a—a* of Fig. 3, looking in the direction of the arrows.

Fig. 5 is a partial sectional view taken at the junction of the A-frame and the cross member and on the line *b—b* of Fig. 1.

Figs. 6, 7, 8 and 9 are diagrammatic views showing the compensating mechanism in various positions, the different relative positions assumed by loading and unloading the same together with a disclosure of the operation of the differential rocker seat.

Referring to the drawings:—

In the embodiment shown, there is provided a main-frame or chassis having two side bars 11, usually formed integral with a rear-bar 12, such side bars 11 also being connected together by a cross bar or bars 13 usually, riveted at the ends to the side bars 11, as shown in Fig. 1, so as to form the rectangular rear frame-portion of the chassis. The cross-bars 13, are usually of the L-shaped form in cross section indicated in Fig. 1, with the downwardly depending webs thereof facing toward each other; and supported by these bars adjacent to the longitudinal center of such bars, by being riveted to the webs thereof; are spring supports 15 (Figs. 1, 2, 6 and 9 inclusive) substantially of the form shown; through which pass the shock buffer-rods 16, which pass down through the supporting members 15, and also through the forward end of the compensating-spring-lever 17, of the A-frame, and such spring-rods are provided at the top with heads 18, and at the bottom with nuts 19; and located between the heads 18 and the bottom of the supports 15, is the upper light-shock spring 20; while in like manner between the inside of the member 17, and the nut 19, is located a like lower light shock-spring 21; such lever 17 being usually provided with a cavity spring cap 17' (Fig. 2), to center the spring upon the rod 16; and usually a center-buffer-collar 15' (Figs. 6 to 9), is secured at the center of the rod 16, to prevent back-lash of the lever 17 upon the upward throw.

The A-frame side-members 22, are usually formed integral with the front cross-member 23, of such frame; and such members 22, are vibratorily mounted upon the main axle 23', by suitable split-journals 24, (Figs. 2, 6, 7, 8 and 9), the forward half of which are each formed integral with its member 17; and such rear or main axle 23', has mounted thereon at the center the differential gear-housing 25, which gearing is actuated by the drive shaft 26, in the well known manner.

Secured on either side of the main-frame, usually upon the outwardly projecting brackets 26' and 26'', are the side spring members 27 of the leaf spring construction, formed with the concave sides thereof facing outwardly; and the front end of the main leaves 28 thereof, are connected to a bracket-bolt 29, the supporting plate of which is bolted to the side pieces 11 by bolts 30; and the rear end of such main leaves 28, are in like manner pivotally connected (Figs. 2 to 6, etc.,) to a supporting pivot-bolt 31, carried by a link 32 pivoted on a pivot bolt 33, carried by the J-shape bracket 26' secured to the side brackets 26'' of the chassis, as shown in position, in Fig. 2. And on an enlarged scale, in detail in Figs. 3, 4 and 5, the reference letter B designates my improved non-frictional main-spring-floating journal-box. Each of these floating-journal-mechanisms, comprises a spring-clip-member or supporting yoke 35, having the upper main-spring-yoke portion 36, and the wings 37, through which by means of nut-bolts 38, the floating-journal-housing 39, is secured to and supported by its suspension leaf-spring 27, as clearly shown in Figs. 2, 3 and 4. Such housing is entirely closed at the outer face 40 (Figs. 1 and 4), and is of substantially the contour and of the conico-ogival shape shown; having at the point on the inner-wall the curved or rounded rock-surface 41; while the inner-wall 42 is provided with a journal-orifice 43, of the substantially elliptical form clearly indicated in Fig. 3, larger in all dimensions than is the cross-sectional area of the float-bar or shaft 50, secured to the floating or rock members or journals 46, by keys 47.

Formed on the interior face of the upper inner wall surface of the housing 39, is a rack-gear 44, usually of a slightly sector or segmental form, to receive the coacting gear-teeth of the sector or segmental gear 45, formed in the upper segmental surface of the rocking-member or float-journal 46; and in order to prevent side-slip of such rocking-member, float or journal-box in the housing, such gear-teeth are located only at the center, as is clearly indicated in Figs. 3 and 4.

The cross-member or float-shaft 50, is connected by a torsion-rod 51, and a collar 52, with the housing 25 of the differential driving gear, as shown in Fig. 1.

The essence and fundamental, and most valuable feature of my invention herein disclosed, consists first, in the fact that small shocks either upward or downward, whether caused by the traction wheels hitting an obstruction and rising, or by dropping into a hole, or by the return action of the downward movement of the tonneau or body of the vehicle upon the springs after passing over an obstruction, etc., are taken up by the comparatively weak coil-springs 20 and 21; and that greater shocks of like character, after taking up all the tension of the primary shock-springs 20 and 21 are immediately transferred to the main vehicle suspension-spring 27, and consequently as the shock is increased, the leverage exerted upon both springs by the vibrating member or spring compensating-lever 17, is shifted, and varied, so as to result in easing the shocks, by reason of the vibration of the rocking-journal-box-member 46, as hereinafter more fully described.

Fig. 6 shows in diagrammatic view, the normal position of my improved shock-absorbing device; and therein the point indicated by the black-dot 54, designates the central-point of the sector-gear of the floating-journal-box or member 46, which contacts with and forms the fulcrum of such float-journal-box with the coacting sector rack-gear 44 of the housing 39. Being in such position, if now the traction-wheel G should pass over an obstruction, say a small stone, the compensating-lever, or moving or vibrating member 17, will be forced down against the tension of the slight-shock springs 20 and 21, into the position indicated in Fig. 7; whereupon the fulcrumed point 54, will be shifted to the rear, to the point indicated in such Fig. 7, carrying with it in the same direction the float-shaft or member 50. If the obstruction is larger, and the consequent shock in passing over is greater, the primary-shock-springs 20 and 21, are thrown down into fully compressed position, as shown in Fig. 8, and the fulcrum point 54, is shifted still farther to the rear, as is likewise the float shaft 45, thus increasing the leverage and when the limit of the compression of the primary-springs 20 and 21 is reached any further shock is then taken up by the main vehicle supporting side leaf-springs 27.

*Per contra*, if at any time by reaction of the weight of the tonneau, after passing over an obstruction, or the traction wheel passing into a depression in the roadway, the weight of the tonneau and its contents should act upon the shock-absorbing-mechanism; the fulcrum joint 54 will be shifted toward the front, as indicated in Fig. 9.

In such Figs. 7, 8 and 9, the dotted circles with crosses indicate the vertical position assumed by the rear-axle 23, carrying the vehicle traction-wheels G under the different conditions of road-shock hereinbefore described.

As shown in Figs. 3, 4 and 5, the orifice 43 in the rear wall of the housing 39 of the float-journal, is much larger than the exterior contour of the float-shaft or member 50; so as to permit of full play of such shaft in all directions; and it is also evident from such drawing that when such shaft is forced downward; or the traction-wheels are forced upward, the rock point 41' (Figs. 3 and 4), of the float-journal-box member 46, will cause the same to rock without friction, and easily upon the curved rock-surface 41, at the bottom center of the housing.

It is evident that many changes and modifications in the construction of my said invention may be made without departing from the scope thereof; and I do not limit myself to the exact form of construction shown.

I claim:

1. In a device of the class described; a suspension-spring; a primary-shock-spring device; a compensating-lever in actuating connection with the primary-shock-spring device; a float-journal-box in actuating connection with the compensating-lever carried by the suspension-spring; and means for causing movement of such float-journal upon road shock, to ease the same.

2. In a device of the class described; a plurality of suspension-springs; a primary-shock-spring device; a compensating-lever for each of the suspension-springs in actuating connection with the primary-shock-spring device; a float-journal-box in actuating connection with the compensating-lever carried by each of the suspension-springs; and means for causing movement of such float-journal upon road shock, to ease the same.

3. In a device of the class described; a plurality of suspension-springs; a primary-shock-spring device; compensating-lever mechanism in actuating connection with the primary-shock-spring device; a plurality of float-journal-boxes in actuating connection with the compensating-lever mechanism carried by the suspension-springs, and a float-bar or shaft connecting the float-journal-boxes.

4. In a device of the class described; a suspension spring; a compensating lever; a primary shock-absorbing yielding device; and a float-journal-box connecting the suspension-spring with the compensating-lever in such manner that strain is only brought upon the suspension-spring when the primary shock-absorbing yielding device has reached the limit of its action.

5. In a device of the class described; a suspension-spring; a primary-shock-spring device; a compensating-lever in actuating connection with the primary-shock-spring device; a journal-box housing, connected with the compensating-lever and with the suspension-spring; and a floating journal-box vibratorily mounted in the housing.

6. In a vehicle, a main-frame or chassis; a spring or springs supporting the main-frame or chassis; a primary shock-absorbing spring mechanism; a main axle; a compensating-lever secured at one end to the primary shock-absorbing mechanism; and a compensating-lever located below the main vehicle supporting spring connected at one end with the primary shock absorbing mechanism and at the other with the traction wheel or wheels; and a floating-journal connecting the main-frame, with the supporting-spring, and the compensating lever.

7. In a vehicle, a main-frame or chassis; a side-supporting spring secured at both ends to the side bars of such main frame or chassis; a main-axle supported by such main-frame; traction-wheels mounted upon such axle; an A-frame forming a compensating-lever vibratorily supported at one end by such axle; a primary shock-absorbing mechanism connected with the A-frame at the other end; a housing forming a connection between the central portion of each of the supporting-springs and the like central portion of the adjacent side-piece of the A-frame; a floating-journal-box located within each housing; and a float-shaft or member connecting such two floating-journal-boxes with one another.

8. In a vehicle, a main-frame or chassis; a traction wheel or wheels supporting such main-frame or chassis; a suspension-spring or springs supported by the main-frame or chassis; mechanism adjacent thereto for taking up minor road-shocks and transmitting the superior shocks to said supporting spring upon a limit being reached; a float-journal-box or boxes forming an intermediate connection between the supporting-frame, spring and traction wheel or wheels in such manner that such floating-journal or journals form a differential floating-journal connection between the traction wheel or wheels, and the main-frame or chassis; the float-member of the journal being located in a suitable housing in such manner that the same will be automatically vibrated or reciprocated in accordance with the varying road-shock.

9. In a device of the class specified, a plurality of suspension springs, a primary-shock-spring device, compensating lever mechanism in actuating connection with said primary-shock-spring device, differential rocker spring seats in connection with said suspension springs whereby the fulcrum of the entire suspension is automatically shifted toward that end of said suspension experiencing the maximum compressive action.

EMIL KOEB.

Witnesses:
L. W. KELLEY,
H. I. SIEGEL.